(12) United States Patent
Kitamura et al.

(10) Patent No.: US 6,863,089 B2
(45) Date of Patent: Mar. 8, 2005

(54) HOSE FOR INTRODUCTION AND DISTRIBUTION OF INFLATORS GAS

(75) Inventors: Mamoru Kitamura, Osaka (JP); Tamotsu Fujii, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/270,009

(22) Filed: Oct. 15, 2002

(65) Prior Publication Data

US 2003/0089412 A1 May 15, 2003

(30) Foreign Application Priority Data

Oct. 23, 2001 (JP) ........................................ 2001-325256
Oct. 29, 2001 (JP) ........................................ 2001-331319

(51) Int. Cl.$^7$ ............................ F16L 11/00; B60R 21/26
(52) U.S. Cl. ...................... 138/126; 138/125; 138/145; 280/730.2; 280/736; 239/145; 239/601
(58) Field of Search ................................ 138/126, 125, 138/145, 146; 280/730.2, 736; 239/145, 601, 566, 567, 568

(56) References Cited

U.S. PATENT DOCUMENTS

| | | | | |
|---|---|---|---|---|
| 3,777,987 A | * | 12/1973 | Allport | 239/542 |
| 3,911,961 A | * | 10/1975 | Peyton et al. | 138/113 |
| 4,095,750 A | * | 6/1978 | Gilead | 239/542 |
| 4,495,134 A | * | 1/1985 | Ouchi et al. | 264/516 |
| 4,523,874 A | * | 6/1985 | Miki et al. | 405/43 |
| 4,577,997 A | * | 3/1986 | Lehto et al. | 405/43 |
| 5,263,791 A | * | 11/1993 | Zeman | 405/43 |
| 5,316,336 A | * | 5/1994 | Taguchi et al. | 280/730.2 |
| 5,897,929 A | * | 4/1999 | Li et al. | 428/36.1 |
| 5,967,550 A | * | 10/1999 | Shirk et al. | 280/736 |
| 6,056,211 A | * | 5/2000 | DiLoreto | 239/288 |
| 6,073,961 A | * | 6/2000 | Bailey et al. | 280/730.2 |
| 6,164,688 A | | 12/2000 | Einsiedel et al. | 280/730.2 |
| 6,260,878 B1 | * | 7/2001 | Tanase | 280/730.2 |
| 2004/0046065 A1 | * | 3/2004 | Jeong | 239/566 |

FOREIGN PATENT DOCUMENTS

| | | |
|---|---|---|
| GB | 2 361217 | 10/2001 |
| JP | 10-100840 | 4/1998 |
| JP | 2001-171467 | 6/2001 |
| JP | 2002-029359 | 1/2002 |
| JP | 2002-067862 | 3/2002 |

* cited by examiner

*Primary Examiner*—Patrick Brinson
(74) *Attorney, Agent, or Firm*—Morrison & Foerster LLP

(57) ABSTRACT

Disclosed herein is a hose for introduction and distribution of inflator gas which is characterized in that the hose is placed in an air bag apparatus for side collision and distributes the inflator gas upon operation of the air bag, that outside surface and/or inside surface of the hose are/is coated with rubber or synthetic resin and that the hose has a distribution hole.

8 Claims, 1 Drawing Sheet

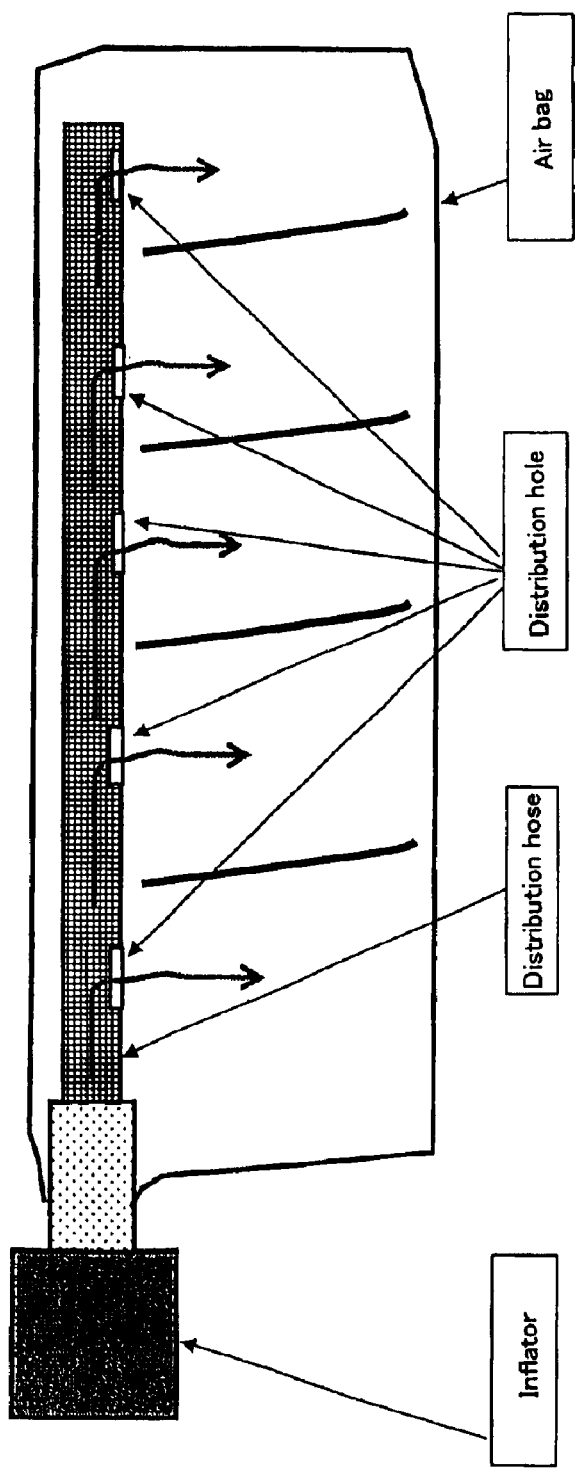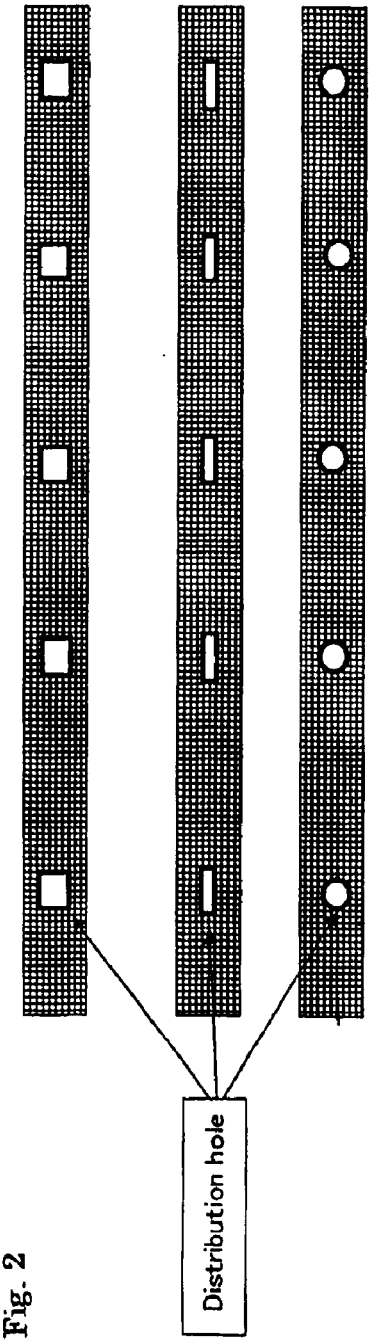

HOSE FOR INTRODUCTION AND DISTRIBUTION OF INFLATORS GAS

BACKGROUND OF THE INVENTION

1. Field of the Invention

The present invention relates to a hose for introduction and distribution of inflator gas used for an air bag apparatus against the side collision which protects the persons in the car upon crash from the side of the car. More particularly, it relates to a hose for introduction and distribution of inflator gas which is optimum for controlling the inflator gas flow where the hose has a distribution hole and is coated at least at one side.

2. Description of the Related Art

In driver's seat and assistant driver's seat, there are installed air bag apparatuses which expand the air bag to constrain the drivers upon collision of the car. The air bag apparatus is composed of an inflator which is a device for generation of gas and, an air bag which expands by the inflator gas and an air bag case receiving them.

In recent years, there has been a big demand for installment of an air bag apparatus for side collision called a curtain air bag coping with the side collision in addition to the front collision at the driver's seat and the assistant driver's seat. With regard to the air bag for side collision, a thing being folded and received in a center pillar and front pillar where inflator gas is introduced from the rear part has been considered. Although it is necessary that the air bag for side collision is instantly developed in a planar form between the door and the passenger, there is apt to happen a problem that unusual pressure is applied at the part where inflator gas is introduced resulting in burst. In order to resist the local pressure, it is necessary to use thick fiber or highly strong fiber such as Kevlar to reinforce the strength of the bag as a whole. When the fiber is made thick, it becomes bulky and causes a problem in its receiving property whereby that is less practical. When a highly strong fiber is used, the cost becomes high causing a problem. It has been investigated that, by paying attention to distribution of inflator gas, metal tube or planar sheet is sewed to make a cylindrical shape as a distribution hose. However, when metal tube is used, although the strength is satisfactory, the tube lacks in softness and flexibility and there is a problem in receiving it. In addition, since metal has a good heat transfer and melts the air bag near the inflator, there is a problem of its use as an air bag for side collision which is demanded to keep the pressure for relatively long time. On the other hand, in the case where planar sheet is sewed to make a cylindrical shape, there causes breakage from the sewed area or breakage by the heat of inflator from near the inlet of the inflator whereby no satisfactory product has been available.

It is the current state that, in the above-mentioned conventional air bags for side collision, there is available no hose for gas distribution of air bags for side collision where breakage near the inlet of inflator is prevented, receiving property is good and cost is advantageous.

OBJECT OF THE INVENTION

The present invention has been created in view of the above-mentioned current state in the prior art as such and its object is to provide a hose for introduction and distribution of inflator gas being able to be used for an air bag apparatus for side collision where the receiving property of the air bag for side collision is improved, the receiving space is reduced, breakage near the inlet of inflator is prevented and the cost is advantageous.

SUMMARY OF THE INVENTION

The present invention is a hose for introduction and distribution of inflator gas which is characterized in that the hose is placed in an air bag apparatus for side collision and distributes the inflator gas upon operation of the airbag, that outside surface and/or inside surface of the hose are/is coated with rubber or synthetic resin and that the hose has a distribution hole. FIG. 1 shows the introduction and distribution of inflator gas the hose according to the present invention.

Preferred embodiments of the hose of the present invention will be apparent from the dependent claims.

BRIEF DESCRIPTION OF THE DRAWINGS

The invention will be better understood by reference to the Detailed Description of the Preferred Embodiments when taken together with the attached Figures, wherein:

FIG. 1 schematically shows a hose for introducing and distributing inflator gas; and FIG. 2 schematically shows three specific examples of the distribution holes.

DETAILED DESCRIPTION OF THE PREFERRED EMBODIMENTS

As to the fiber constituting the hose of the present invention and the air bag which is connected to the hose, there may be used polyamide fiber, polyester fiber, etc. although the present invention is not limited thereto. Strength of the yarn is not less than 6 g/dtex, preferably not less than 7 g/dtex or, more preferably, not less than 7.5 g/dtex.

The hose of the present invention can be prepared using a cylindrical weaving machine used for weaving a fire hose and the like. When a cylindrical weaving machine is used, there is no necessity of conducting a process for making a cylinder whereby the processing cost such as sewing can be reduced. In addition, it is not necessary to take the breakage from the sewed part into consideration and the reliability is increased.

It is necessary that at least one side of the hose of the present invention is coated with rubber or with synthetic resin. Examples of the rubber to be coated are neoprene rubber, ethylene propylene diene rubber and silicone rubber. Examples of the silicone rubber are thermosetting addition polymerization silicone rubber and RTV silicone rubber of a two-liquid type although they are non-limitative. The silicone rubber may use silane coupling agent of an amino type, epoxy-modified silane coupling agent, silane coupling agent of a vinyl type, silicone coupling agent of a chlorine type, etc. for improving the adhesive property. As a result of improving the adhesive property, it is possible to increase the slip-off resistance. With regard to the synthetic resin, there may be used polyester, polyamide, elastomer of a polyester type, elastomer of a polyamide type, elastomer of a polyurethane type, etc. although they are non-limitative.

The hose of the present invention may have a distribution hole in any shape or any size and it is preferred that the distribution hole is substantially square or rectangular where each side is located substantially parallel to or in a right angle to warp or woof constituting the hose. Distribution hole in a circular shape is inferior to that in a square or rectangular shape in terms of the preference. That is because, when the shape of the distribution hole is circular, easily unraveled parts are formed at the area where ends of the warp and woof are crossed, resistance to gas flow at the area upon development of the air bag become big and the possibility of unusual breakage becomes high. FIG. 2 shows hoses with square distribution holes, rectangular distribution holes, and with circular distribution holes. Side lengths or diameter of the distribution hole is preferably 5~40 mm or, more preferably, 10~30 mm. When it is more than 40 mm, flow rate of the inflator gas becomes high and local heating is generated whereby breakage is resulted from such a part and that is not preferred. When it is less than 5 mm, many distribution holes are to be formed whereby the processing cost is needed and that is not preferred. Although it is not necessary to particularly process the surrounding of the distribution hole, such a part may be fused by heat or may be sewed.

It is preferred that the slip-off resistance of the warp and the woof of the hose of the present invention is not less than 10 N, more preferably not less than 15 N and, particularly preferably, not less than 20 N. When the slip-off resistance is less than 10 N, unusual deformation of the hose occurs near the distribution hole due to the inflator gas or the distribution hole becomes large by such a deformation whereby the distributing ratio is unable to be controlled and that is not preferred. When the distribution hole becomes large, the air bag for side collision may burst during the initial stage of its development and that is not preferred. Slip-off resistance is able to be adjusted by the control of amount of the coat, amount of the additive or fineness of warp and/or woof constituting the hose.

Diameter of the hose is preferably 20~60 mm or, preferably, 30~50 mm. When the hose diameter is less than 20 mm, breakage is apt to occur while, when it is more than 60 mm, the hose is hardly received in the air bag for side collision and that is not preferred.

Crimp of the woof constituting the hose is preferably smaller than that of the warp. The woof is apt to be affected by tension and, in order to make the influence of heat as little as possible, the part which comes out of the surface is to be made small. Accordingly, it is better that there is no crimp in the woof and the state of being covered by the warp is better.

Fineness of the yarn constituting the main body of the air bag for side collision is preferably 200~600 dtex or, more preferably, 300~500 dtex. When the fineness is more than 600 dtex, its receiving property becomes a problem. When it is less than 200 dtex, strength of the substrate cloth is insufficient resulting in a high possibility of burst even if distribution of the inflator gas is controlled and that is not preferred. Fineness of single yarn of the multifilament constituting the main body of the air bag for side collision is preferably 2~10 dtex or, more preferably, 3~6 dtex. When the single yarn fineness is more than 10 dtex, rigidity of the substrate cloth becomes high and receiving property lowers. When it is less than 2 dtex, snapping of the single yarn or the like happens upon weaving whereby many disadvantages of the substrate cloth are resulted and that is not preferred.

Fineness of one multifilament of warp constituting the hose is preferably not less than two-fold or, more preferably, not less than three-fold, of fineness of one multifilament constituting the main body of the air bag for side collision. When the fineness of warp of the hose is less than two-fold, the hose is apt to cause poor distribution by cutting-off of the warp in the distribution of the inflator gas and that is not preferred.

Fineness of one multifilament of woof constituting the hose is to be not less than three-fold or, more preferably, not less than five-fold, of fineness of one multifilament constituting the main body of the air bag for side collision. When the fineness of one multifilament of woof constituting the hose is less than three-fold, the hose is apt to cause poor distribution by cutting-off of the woof and that is not preferred.

EXAMPLES

The present invention will now be illustrated in more detail by the following Examples. Measurements in the Examples are carried out in accordance with the following measuring methods.

Slip-off resistance: Conducted according to "Method A; method for pulling out the yarn; resistance to sliding-off" of JIS L1096.

Distribution test: Into a test connecting tube where one side was closed by sewing was introduced nitrogen gas compressed to an initial pressure of 800 kPa to an extent of volume of 5 liters from another inlet which was not sewed and then the state of the distribution hole was observed. The test connecting tube was made in 2 m and five distribution holes having predetermined shape and size were set up every 30 cm from the inlet.

With regard to the result of the evaluation, there was observed the state of the distribution hole by deformation of warp and woof at the nearest distribution hole from the nitrogen gas inlet in the hose after the test.

Shape of the observed distribution hole was evaluated according to the five stages of A to D.

A: deformation of the shape was hardly noted
B: deformation of the shape was noted very little
C: deformation of the shape was noted a little
D: deformation of the shape was noted considerably
E: deformation of the shape was noted significantly Examples 1~9 and Comparative Example 1

A tube was woven on cylindrical weaving machine using a polyamide 66 fiber having strength of 8.0 g/dtex, then a coating agent was uniformly applied thereon and setting was carried out at 140° C. for 5 minutes to prepare a hose for introduction and distribution of inflator gas. Results of the Examples and the Comparative Example of the hose for distribution of inflator gas manufactured as such are shown in Table 1.

TABLE 1

|  | Ex 1 | Ex 2 | Ex 3 | Ex 4 | Ex 5 | Ex 6 | Ex 7 | Ex 8 | Ex 9 | CE 1 |
|---|---|---|---|---|---|---|---|---|---|---|
| Tube | | | | | | | | | | |
| Material of Warp | Ny66 | Ny66 | Ny66 | Ny66 | Ny66 | Ny66 | Ny66 | Ny66 | Ny66 | Ny66 |
| Material of Woof | Ny66 | Ny66 | Ny66 | Ny66 | Ny66 | Ny66 | Ny66 | Ny66 | Ny66 | Ny66 |
| Fineness of Warp (dtex) | 1500 | 1500 | 1050 | 2350 | 2350 | 2350 | 1410 | 1500 | 1500 | 1500 |
| Fineness of Woof (dtex) | 3500 | 3500 | 1750 | 4700 | 4700 | 4700 | 2350 | 3500 | 3500 | 3500 |
| Density of Tube | | | | | | | | | | |
| Warps (nos. per inch) | 37 | 37 | 40 | 29 | 29 | 29 | 37 | 37 | 37 | 37 |
| Woofs (nos. per inch) | 12 | 12 | 17 | 10 | 10 | 10 | 14 | 12 | 12 | 12 |
| Coating Agent | | | | | | | | | | |
| Amt of coating agent (g/m²) | 150 | 150 | 150 | 150 | 150 | 150 | 150 | 50 | 150 | 0 |
| Type | S1 | S1 | S1 | S1 | S1 | S1 | S1 | S1 | S1 | — |
| Type of Additive | A | A | A | A | A | A | A | A | A | — |
| Amt of Additive (parts by wt) | 2 | 2 | 2 | 2 | 2 | 2 | 2 | 1 | 0 | — |
| Coated Side | Os | os | os | os | os | os | os | os | os | — |
| Shape of Distribution Hole | Sq | cir | sq | sq | rec | cir | sq | aq | sq | sq |
| Size of Distribution Hole (mm) | 10. × 10 | 10 | 10 × 10 | 10 × 10 | 10 × 20 | 20 | 10 × 10 | 10 × 10 | 10 × 10 | 10 × 10 |
| Slip-off resistance | | | | | | | | | | |
| Warp (N) | 37 | 37 | 29 | 65 | 65 | 65 | 34 | 15 | 25 | 3 |
| Woof (N) | 30 | 30 | 25 | 50 | 50 | 50 | 26 | 8 | 14 | 0.6 |
| Evaluation of Distribution Hole | A | C | B | A | A | C | A | D | D | E |

Coating agent S1: Elastosil M-4540 manufactured by Wacker (thermosetting addition-polymerized silicone rubber)
Additive A: Adhesion Promotor HF86 manufactured by Wacker (epoxy-modified silane coupling agent)
CE: Comparative Example
os: outside
sq: square
cir: circular
rec: rectangular Considerations From the results of evaluation for Examples 1 and 2 versus 4 and Examples 5 versus 6 in Table 1, it is noted that, with regard to the shape of the distribution hole, deformation of the distribution hole is rarer in the case of square or rectangle (Examples 1, 4 and 5) than in the case of circle (Examples 2 and 6).

From Example 1 and Example 3, it is noted that, when fineness of warp and woof is made large (Example 1), slip-off resistance becomes high and distribution hole is hardly deformed.

From the result of Example 7 and Example 8, it is noted that coating amount is proportional to slip-off resistance and that, when coating amount is high (Example 7), slip-off resistance is high and distribution hole is hardly deformed.

From the result of Example 7 and Example 9, it is noted that, when an epoxy-modified silane coupling agent is added as an auxiliary adhesive, slip-off resistance is improved (Example 7) and distribution hole is hardly deformed.

It is also noted from Table 1 that the distribution hoses of the inflator gas of the present invention (Examples 1~9) are hardly deformed in terms of the shape of the distribution hole as compared with the inflator gas distribution hoses of Comparative Example 1 which is not coated with a coating agent and accordingly that they are suitable as distribution hoses.

Advantage of the Invention

As fully illustrated hereinabove, in the distribution hose for inflator gas according to the present invention, breakage near the inlet of the inflator is prevented and gas is homogeneously distributed whereby it is now possible to provide a method for distribution of air bag for side collision having good developing property, having good receiving property and being advantageous in terms of cost.

What is claimed is:

1. A hose for introduction and distribution of inflator gas in an air bag apparatus for side collision, wherein the hose comprises:

warp and woof comprising
   an outside surface and an inside surface, wherein the outside surface and/or inside surface of the hose are/is coated with rubber or synthetic resin; and
   a distribution hole to distribute the inflator gas within said air bag upon operation of the air bag, wherein the distribution hole is substantially square or rectangular and each side is substantially parallel to or in a right angle to the warp or the woof of the hose.

2. The hose for introduction and distribution of inflator gas according to claim 1, wherein slip-off resistance of the warp and woof fibers is not less than 10 N (Newtons).

3. The hose for introduction and distribution of inflator gas according to claim 2, wherein the slip-off resistance of the warp and woof fibers is not less than 15 N (Newtons).

4. The hose for introduction and distribution of inflator gas according to claim 1, wherein a side length of the distribution hole is from 5 to 40 mm.

5. The hose for introduction and distribution of inflator gas according to claim 1, wherein fineness of one multifilament of warp is in such a relationship that it is not less than two-fold than fineness of one multifilament constituting the main body of the air bag for side collision.

6. The hose for introduction and distribution of inflator gas according to claim 1, wherein fineness of one multifilament of woof is in such a relationship that it is not less than three-fold than fineness of one multifilament constituting the main body of the air bag for side collision.

7. The hose for introduction and distribution of inflator gas according to claim 1, wherein there is used a hose in which crimp of the woof is in such a relationship that it is smaller than crimp of the warp.

8. The hose for introduction and distribution of inflator gas according to claim 1, wherein the woof of the hose is substantially covered by the warp.

* * * * *